Patented May 4, 1954

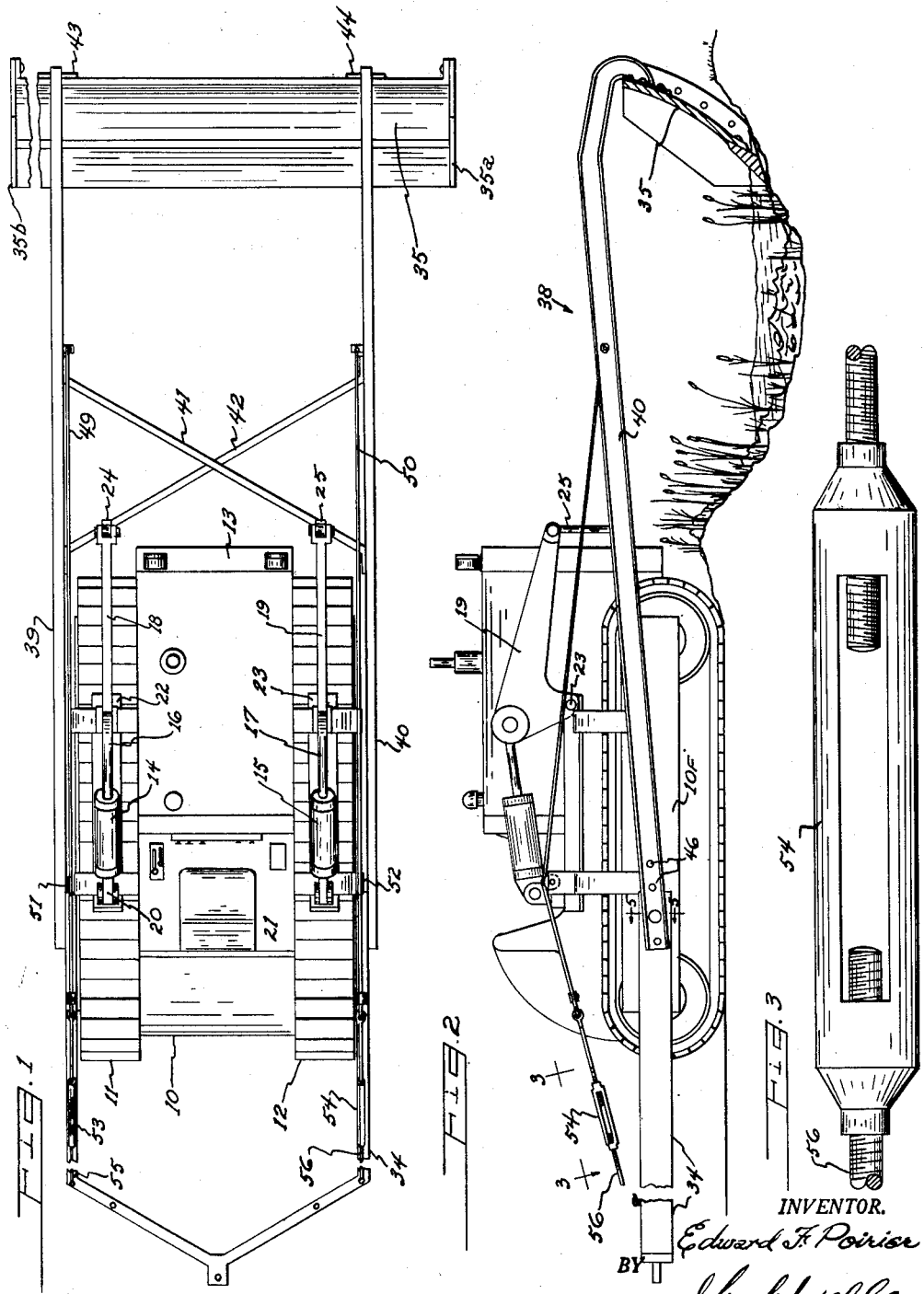

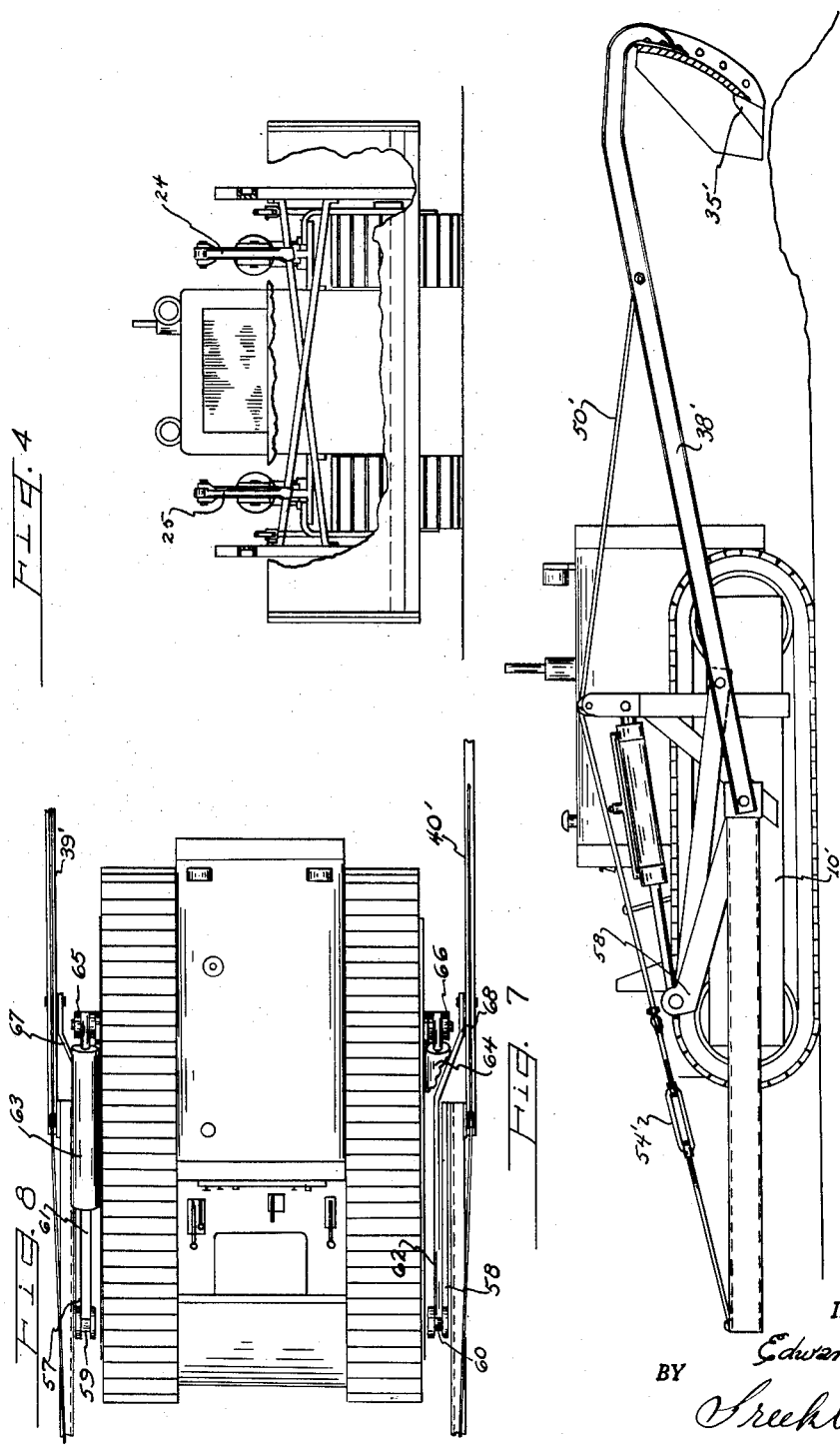

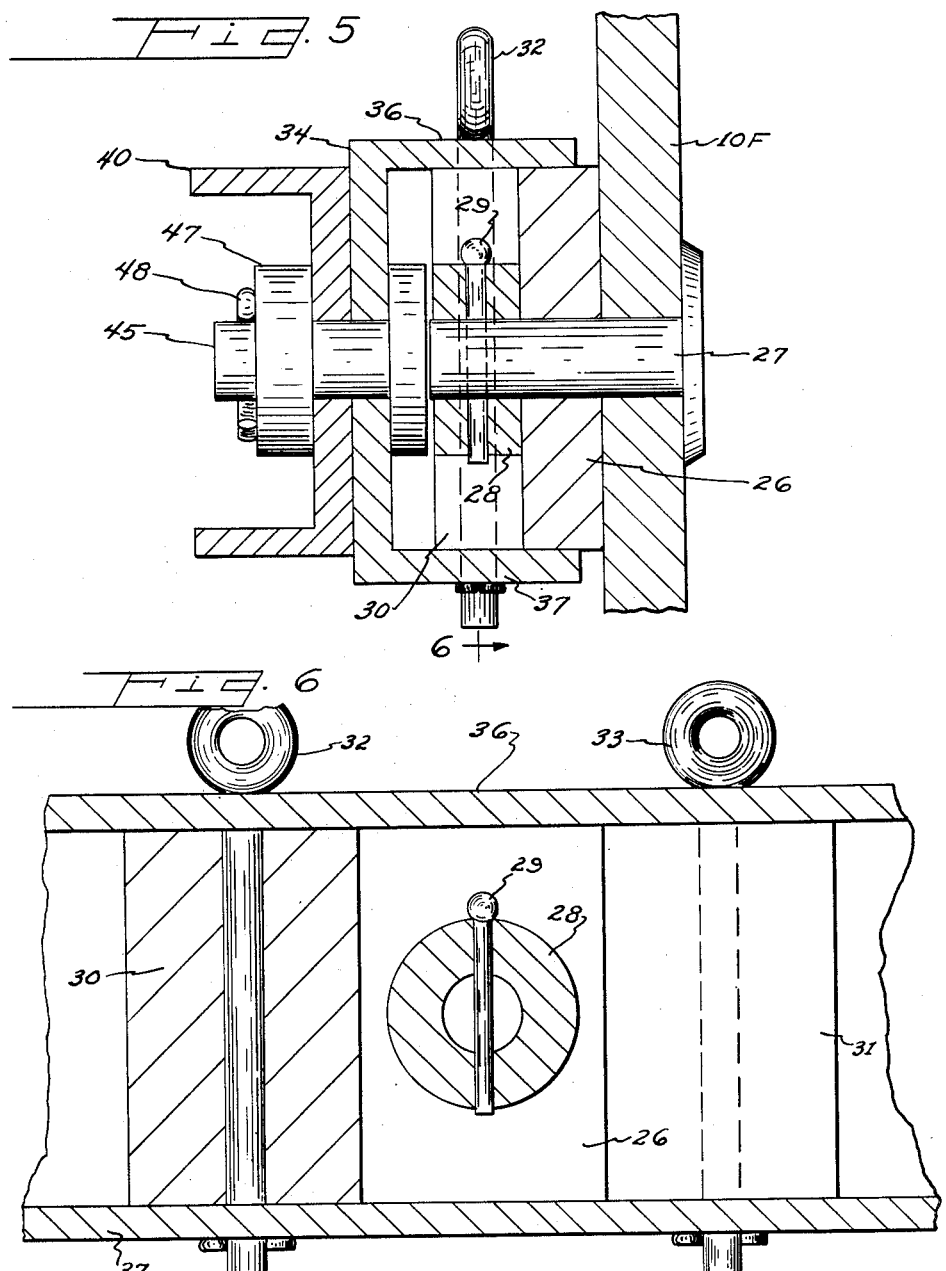

2,677,203

UNITED STATES PATENT OFFICE 2,677,203

DITCHING ATTACHMENT FOR BULLDOZERS

Edward F. Poirier, Newport, Wash.

Application August 21, 1950, Serial No. 180,534

2 Claims. (Cl. 37—143)

The invention relates to improvements in a ditching attachment for bulldozers.

One of the difficult problems in connection with farming where irrigation or drainage ditches have to be provided, is the problem of keeping the ditches and ditch banks cleared. Any ditch that is in use very long tends to become filled with muck and with the growth of vegetation. Weeds, willows, etc. flourish on the banks of ditches and often in the bottom thereof. Much of the difficulty of keeping the ditches and ditch banks clean can be overcome if the ground surface along the ditch is maintained smooth enough to permit cutting of the young vegetation before it reaches too large a size.

It is the purpose of my invention to provide an attachment for use with the usual bulldozer construction, that is powered by a track laying vehicle that will enable the farmer to clean the ditch and smooth the ground on the sides of the ditch at the time of cleaning so that thereafter he can mow the vegetation along the ditch and keep down the undesirable growth. With the ditch banks cleaned and smoothed with my device, the land right up to the ditch can be utilized for crops, thus avoiding considerable waste of land.

According to my invention I provide, in addition to the usual blade supporting frame of the bulldozer, an additional frame, the arms of which are much longer than the ordinary bulldozer frame. This frame carries the bulldozer blade reversed so that it faces toward the vehicle. The usual blade supporting frame is reversed on the vehicle. This frame and my auxiliary blade carrying frame are both pivoted at the same point to the vehicle and are coupled together in such a fashion that the blade is counterbalanced by the reversed frame. The operating mechanism for raising and lowering the blade is connected to the auxiliary frame.

The nature and advantages of my invention will appear more fully from the following description and the accompanying drawings wherein a preferred form of my invention is shown as applied to two different types of bulldozers now commonly used by farmers. It is to be understood, however, that the drawings and descriptions are illustrative only and are not to be considered as limiting the invention except insofar as it is limited by the claims.

In the drawings:

Figure 1 is a plan view illustrating my attachment as applied to a well known form of bulldozer;

Figure 2 is a view in side elevation of the device shown in Figure 1;

Figure 3 is an enlarged detailed view taken substantially on the line 3—3 of Figure 2;

Figure 4 is a front end view with part of the blade broken away of the machine shown in Figure 1;

Figure 5 is an enlarged fragmentary sectional view taken on the line 5—5 of Figure 2;

Figure 6 is a fragmentary sectional view taken on the line 6—6 of Figure 5;

Figure 7 is a view in side elevation of another form of bulldozer showing my attachment as applied thereto; and Figure 8 is a plan view of a portion of the device shown in Figure 4.

Referring now in detail to the drawings and particularly to Figures 1–6 inclusive, my invention is shown as attached to a bulldozer which is powered by a track laying vehicle 10 of conventional construction. This vehicle embodies tracks 11 and 12, a power unit 13 and operating hydraulic cylinders 14 and 15 supplied with hydraulic fluid from a pump (not shown) that is operated by the power unit 13. The cylinders 14 and 15 have piston rods 16 and 17 which are linked to levers 18 and 19. The cylinders 14 and 15 are pivoted on the frame of the vehicle 10 at 20 and 21. The levers 18 and 19 are likewise pivoted on the frame of the machine at 22 and 23. Links 24 and 25 are provided at the free ends of levers 18 and 19 for attachment to a blade supporting frame.

On the opposite sides of the vehicle the frame pieces 10F of the vehicle are provided with pivot blocks 26, the detailed construction of which is illustrated best in Figures 5 and 6 of the drawings. Each block 26 is pivoted to the frame piece 10F by a heavy pivot pin 27. A collar 28 is keyed by a pin 29 to the pivot pin 27 that holds the block 26 in place. The block 26 has two enlarged ribs 30 and 31 which are bored to receive retaining pins 32 and 33. The blade frame 34, which is normally used to support a bulldozer blade 35, is attached to blocks 26. The frame 34 is usually constructed of channel iron and flanges 36 and 37 of the frame 34 receive the blocks 26 between them, the retaining pins 32 and 33 being extended through the flanges 36 and 37 as illustrated best in Figure 6. This frame 34 is generally referred to in the field as the A-frame of the bulldozer. Normally this frame extends forwardly from the pivots provided by the blocks 26 and has the blade 35 fixed thereto in any suitable fashion. The links 24 and 25 are usually attached to the frame 34.

In order to adapt the machine for ditch digging and cleaning, I reverse the frame 34 so that it extends rearwardly from the vehicle 10 in the direction indicated in Figures 1 and 2. I provide an auxiliary frame 38 comprising two arms 39 and 40 and cross braces 41 and 42. The arms 39 and 40 are shaped of channel iron as shown in Figure 2 of the drawings and are provided with blade mounting plates 43 and 44 which can be used to attach the blade 35 so that it faces the vehicle 10. The free ends of the arms 39 and 40 are pivotally attached to the machine to turn on the same axis as the frame 34. To accomplish this pivoting, I provide a second pivot pin 45 (see Figure 5) in the web of the channel that forms the A-frame 34 and I provide suitable apertures 46 in the arms 39 and 40 to receive the pivot pin 45. A collar 47 and a cotter pin 48 secure the arms 39 and 40 on the pins 45. The several apertures 46 provide for more or less extension of the arms 39 and 40.

The frames 34 and 38 are adjustably coupled together so as to move in unison with the frame 34 acting as a counterbalance for the frame 38 and the blade 35. Two cables 49 and 50 are secured to the frame 38 forwardly of the cross braces 41 and 42 and extend rearwardly over pulleys 51 and 52 that are mounted on the frame of the vehicle 10. These cables are connected by two turn buckles 53 and 54 to links 56 and 57 that are provided on the A-frame 34. It is evident that by adjusting the turn buckles 53 and 54 the angular relation of the frames 34 and 38 can be varied so that the rise and fall of the frame 38 in normal operation will not cause the frame 34 to engage the ground.

The links 24 and 25 are connected to the cross braces 41 and 42 which are of adequate strength to serve as the lifting and lowering means for the frame 38. The operator can raise and lower the blade 35 by means of the hydraulic jacks 14 and 15. In this way he can cause the blade 35 to follow the contour of the ditch as he backs the vehicle 10 to pull the blade across the ditch. The blade load can then be spread away from the bank of the ditch by raising the blade and allowing the load to pass under it to the depth desired. The blade 35 preferably is provided with end plates 35A and 35B so as to prevent spilling of the load over the ends of the blade.

Referring now to Figures 7 and 8, the form of bulldozer illustrated here is also of conventional construction, but slightly different from the form hereinbefore described. The construction of the frames 38' and 34' is essentially the same as in the main form of the invention. The blade 35' is also essentially the same. In this type of machine, however, the mechanism for operating the blade with the frame 34' is somewhat different. The frame 34' carries two heavy arms 57 and 58 which are pivoted on the frame 10' of the machine and are coupled by pivots 59 and 60 to the piston rods 61 and 62 of hydraulic jacks 63 and 64. These jacks are pivoted to upright frame members 65 and 66 of the vehicle 10'. I pivot the frame 38' to the frame 34' in the same manner as in the first form of the invention and in order to raise and lower the frame 38, I connect two links 67 and 68 which normally interconnect the lever arms 57 and 58 with the frame 34' to the arms 39' and 40' of the frame 38'. In order to maintain the frame 34' as a counterbalance, I employ cables 49' and 50' and turn buckles and links in the same fashion as employed in the first form of the invention.

It is believed that the foregoing description is adequate to enable one skilled in the art to make and use my invention. The operator of the vehicle who desires to clear a ditch and level the banks thereof, need not take the vehicle into the ditch at all as he would normally have to do with a bulldozer. He merely drives the vehicle with my attachment thereon up to the bank of the ditch so that the frame 38 carries the blade 35 across the ditch. The operator then backs the vehicle, raising and lowering the blade as he does so, until the blade has crossed the ditch and has spread its load on the near ditch bank. The material taken from the ditch can be spread out thin and smoothly by the blade so that no further operation is necessary to leave a smooth sloping ditch bank. When a ditch has been cleaned, leveled and smoothed in this manner, it is quite easy to cut the growth along the ditch with the ordinary mowing and harvesting machinery. In this way the farmer can utilize substantially all of the land except that actually covered by the water in the ditch.

Having thus described my invention, I claim:

1. A ditch cleaning attachment for a powered vehicle comprising a blade supporting frame having long arms, one end of each arm being provided with an aperture to receive a pivot pin, a scraper blade connecting the other ends of said arms, and facing the vehicle whereby to scrape soil toward the vehicle, a second frame of substantially U-shape having its free ends pivotally mounted on the vehicle, pivot pins carried by said free ends and received in the apertures of said arms, a cable at each side of the vehicle connected at its ends to said frames at points remote from their pivotal mounting, supporting means on the vehicle extending above said frameworks and supporting each cable intermediate its ends, and means to raise and lower the blade supporting frame.

2. A ditch cleaning attachment for a powered vehicle comprising a blade supporting frame having long arms, one end of each arm having a pivot pin therein, a scraper blade connecting the other ends of said arms and facing the vehicle whereby to scrape soil toward the vehicle, a second frame of substantially U-shape having its ends pivotally mounted on the vehicle, said second frame extending around the end of the vehicle remote from the blade, the pivot pins in the ends of said first named arms being mounted on the ends of said second frame, to pivotally mount the first frame on the second frame, means to raise and lower the blade supporting frame, and flexible means connecting the frames together to cause the second frame to rise about its pivotal mounting on the frame as the first frame is lowered about its pivotal mounting on the second frame.

References Cited in the file of this patent

UNITED STATES PATENTS

| Number | Name | Date |
|---|---|---|
| Re. 22,613 | Pawlsen | Mar. 6, 1945 |
| 217,506 | Benson | July 15, 1879 |
| 1,473,890 | Toy et al. | Nov. 13, 1923 |
| 1,909,752 | Calkins | May 16, 1933 |
| 2,233,237 | Andersen et al. | Feb. 25, 1941 |
| 2,247,680 | Graham | July 1, 1941 |
| 2,404,518 | Moran | July 23, 1946 |

FOREIGN PATENTS

| Number | Country | Date |
|---|---|---|
| 396,807 | France | Nov. 27, 1908 |